US009973038B2

United States Patent
Li et al.

(10) Patent No.: US 9,973,038 B2
(45) Date of Patent: May 15, 2018

(54) SELF OPTIMIZING ANTENNA FOR NFC AND WIRELESS CHARGING

(71) Applicant: Cellco Partnership, Arlington, VA (US)

(72) Inventors: Yuk Lun Li, Morganville, NJ (US); Manuel Enrique Caceres, Basking Ridge, NJ (US); Nanjun Qian, Princeton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 357 days.

(21) Appl. No.: 14/045,421

(22) Filed: Oct. 3, 2013

(65) Prior Publication Data

US 2014/0361735 A1     Dec. 11, 2014

Related U.S. Application Data

(63) Continuation-in-part of application No. 13/913,888, filed on Jun. 10, 2013, now Pat. No. 9,774,208.

(51) Int. Cl.
*H02J 7/00* (2006.01)
*G06F 15/16* (2006.01)
*H02J 50/12* (2016.01)
*H02J 7/02* (2016.01)
*H02J 50/90* (2016.01)
*H02J 17/00* (2006.01)
*H04B 5/00* (2006.01)

(52) U.S. Cl.
CPC ............ *H02J 50/12* (2016.02); *H02J 7/0027* (2013.01); *H02J 7/0047* (2013.01); *H02J 7/025* (2013.01); *H02J 17/00* (2013.01); *H02J 50/90* (2016.02); *H04B 5/0037* (2013.01); *H04B 5/0093* (2013.01); *H02J 2007/0001* (2013.01); *H02J 2007/0096* (2013.01)

(58) Field of Classification Search
CPC ....... Y02E 60/12; H02J 7/0004; H02J 7/0006; H02J 7/025; H01M 10/48; H01M 10/4257; H01F 38/14; Y02T 90/122; B60L 11/182; G06Q 10/107; H04L 12/585; H04L 12/58; H04L 12/581; H04L 12/5855
USPC ................................. 320/106, 108; 709/206
See application file for complete search history.

(56) References Cited

U.S. PATENT DOCUMENTS

| | | | | |
|---|---|---|---|---|
| 4,829,404 A | * | 5/1989 | Jensen | H05K 1/0287 174/254 |
| 2002/0057584 A1 | * | 5/2002 | Brockmann | H02J 7/025 363/98 |
| 2007/0277491 A1 | * | 12/2007 | Byttebier | B60Q 1/50 56/10.2 J |
| 2009/0096413 A1 | | 4/2009 | Partovi et al. | |
| 2009/0246596 A1 | * | 10/2009 | Sridhar | B60L 11/1816 429/513 |

(Continued)

FOREIGN PATENT DOCUMENTS

WO     2013/006004     1/2013

*Primary Examiner* — Yalkew Fantu
*Assistant Examiner* — Mohammed J Sharief

(57) ABSTRACT

A charging system may include a charging apparatus having a controller and a power transmitter. The controller may be configured to determine a device position relative to the controller based on at least one signal received from the device. The controller may also be configured to determine whether the device position is at an optimal position, and provide feedback indicative of the device position.

20 Claims, 12 Drawing Sheets

(56) References Cited

U.S. PATENT DOCUMENTS

| | | | |
|---|---|---|---|
| 2010/0315197 A1* | 12/2010 | Solomon | G06F 21/31 340/5.2 |
| 2011/0184888 A1 | 7/2011 | Lee et al. | |
| 2012/0007441 A1* | 1/2012 | John | A61N 1/3785 307/104 |
| 2012/0212072 A1 | 8/2012 | Miyabayashi et al. | |
| 2012/0274275 A1* | 11/2012 | Baek | H02J 7/00 320/109 |
| 2013/0057210 A1* | 3/2013 | Nergaard | H02J 7/0027 320/109 |
| 2013/0088192 A1* | 4/2013 | Eaton | G06F 1/266 320/108 |
| 2013/0091225 A1* | 4/2013 | Eaton | H02J 7/025 709/206 |
| 2013/0203345 A1 | 8/2013 | Fisher | |
| 2013/0234658 A1 | 9/2013 | Endo et al. | |
| 2013/0285604 A1 | 10/2013 | Partovi | |
| 2013/0285605 A1 | 10/2013 | Partovi | |
| 2014/0002013 A1* | 1/2014 | Kossi | H02J 7/025 320/108 |
| 2014/0132210 A1 | 5/2014 | Partovi | |
| 2014/0159651 A1* | 6/2014 | Von Novak | H04B 5/0037 320/108 |
| 2014/0246920 A1 | 9/2014 | Bae | |
| 2014/0266004 A1* | 9/2014 | Andrews, Jr. | B60L 11/005 320/104 |
| 2014/0346888 A1 | 11/2014 | Kim et al. | |

\* cited by examiner

SELF OPTIMIZING ANTENNA FOR NFC AND WIRELESS CHARGING

CROSS REFERENCE TO RELATED APPLICATIONS

This application is a continuation-in-part of U.S. patent application Ser. No. 13/913,888, filed on Jun. 10, 2013, which is hereby incorporated by reference in its entirety.

BACKGROUND INFORMATION

Induction charging may be used to charge the battery of an electronic device, such as a mobile phone, tablet or personal computer. Separate devices, hereinafter referred to as transmitters, may be used to charge these devices when the devices are placed on or near the transmitters and the devices include an appropriate receiver. Devices may be authenticated before charging may occur. Certain technologies, such as near frequency communications (NFC), may require the NFC components of the device and transmitter to be in close proximity to one another in order for authentication to occur. However, users often become frustrated trying to find the 'sweet spot' for NFC alignment. This frustration may lead to poor user experience.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
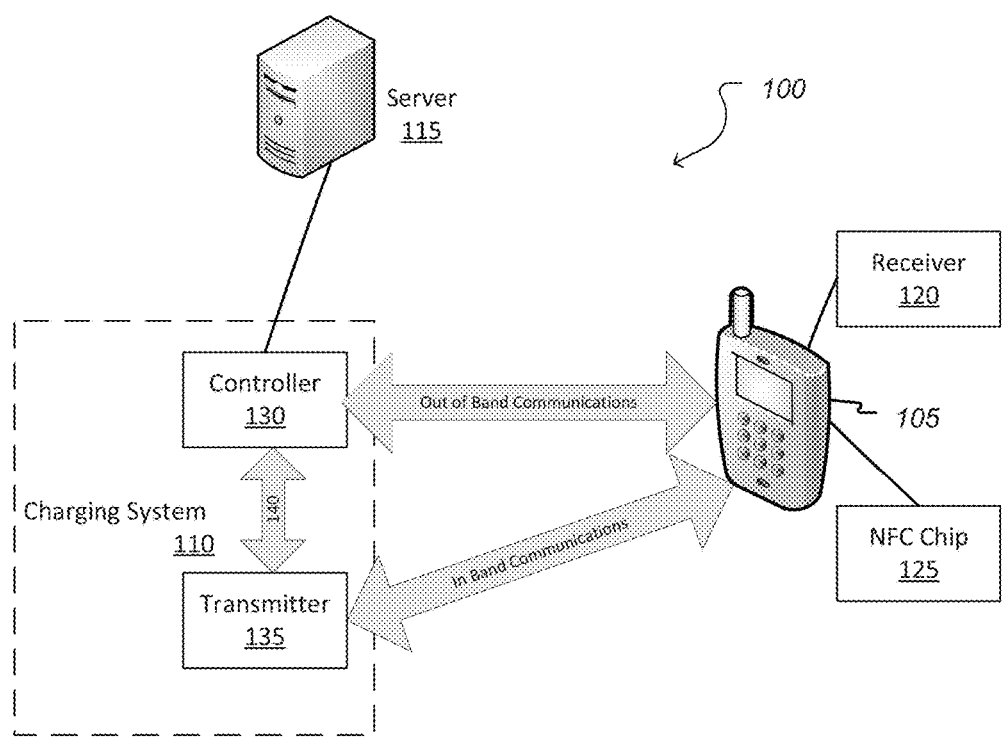
FIG. 1 is a system diagram of the wireless charging system.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device 105. Further, the descriptions set forth herein are not intended to be exhaustive or otherwise limit or restrict the claims to the precise forms and configurations shown in the drawings and disclosed in the following detailed description.

In a wireless charging arrangement, a transmitter may be configured to charge an electronic device, typically a device having a battery that has been depleted. An induction coil within the transmitter may create an alternating electromagnetic field. The electronic device may have a receiver having a coil. The receiver may be configured to receive power from the electromagnetic field created by the transmitter. The battery may then be charged using the power from the transmitter. In order to facilitate efficient power transfer, the transmitter may be substantially aligned with the receiving coil of the device. To better achieve this positioning, the position of the device relative to the transmitter, and vice versa, may be determined. The device's interface may continuously provide feedback about the device position to the user so that the user may move the device to the most optimal position on the charging apparatus. Additionally, the transmitter may be moved within the charging apparatus to achieve an optimal transmitter position. By moving the transmitter and coil together, more efficient charging may be achieved.

Further, an exemplary charging system may include a Near Field Communication (NFC) controller configured to create a secure channel by which a device may transmit information to be authenticated prior to initiating the power transfer. The controller may generate an electromagnetic field and be capable of reading an NFC tag from a chip within a device. Thus, the device does not need to wake-up and transmit a ping (and receive a response thereto) in order to detect the transmitter. To the contrary, the secure channel is used to receive data from the device, without the device having to 'search' for a power source. Further, the secure channel created by the NFC controller may also allow for payment information to be transmitted securely and without using in-band signaling.

Such a system may be used in public places such as shopping malls, airports, etc., to permit users to charge devices at certain charging stations. These charging stations may allow a device to be authenticated at the NFC controller and then subsequently charged at the transmitter. Some charging stations have a controller for every transmitter, while other charging stations may have several transmitters. That is, a device may be placed on or near the NFC controller (i.e., 'tapped') to be authenticated. Once authenticated, the device may be placed on a transmitter for charging. The device may also provide feedback to the user based on the alignment of the device with the NFC controller and transmitter to best optimized authentication and power transfer.

Referring to FIG. 1, a wireless charging system 100 may include an electronic device 105 having a rechargeable power source, a charging system 110 and a server 115. The device 105, while shown as a mobile device, may be a computing device having a processor for executing computer-executable instructions, and a memory and/or other computer readable media for storing data and computer executable instructions. For example, the device 105 may be a smart phone, personal digital assistant, laptop computer, tablet computer, etc. A rechargeable power source, such as a battery may be included in the device 105. The battery may be capable of being charged via inductive charging mechanisms, as described above. The device 105 may include a power receiver 120. The receiver 120 may be integrated within the device 105, or it may be a separate device 105 connected to a charge port of the device 105. It may also be configured to connect to a Universal Serial Bus (USB) port within the device 105. The receiver 120 may include an induction coil configured to receive power transmitted from the charging system 110.

The device 105 may include at least one authentication element, such as a Near Frequency Communication (NFC) chip 125. The NFC chip 125 may capable of transmitting information to other NFC devices, such as controller 130. Such information may include a device identifier, sensitive financial information and other device and/or user information that may be used by the charging system 110. The NFC chip 125 may be powered by the electromagnetic field created by the controller 130. Upon being woken up by the controller 130, the NFC chip 125 may then transmit the information to the controller 130. Other authentication elements may also be included in the device 105, such as a secure removable card, also known as a secure element (not shown). The NFC chip 125 may interface with the secure element via a proprietary protocol to read information from the secure element within the device 105.

The charging system 110, also referred to as a charging apparatus and charging station, may be a system for charging devices 105. For example, a charging station may be located in an airport terminal and may allow travelers the opportunity to charge their devices while waiting for their flight. The charging system 110 may include a controller 130 and a transmitter 135. The controller 130 may be a NFC controller 130 capable of receiving and transmitting information through a NFC protocol at short distances. NFC may be used to authenticate the device 105, as described in more detail herein. NFC technologies are often capable of creating a secure communication channel and may encrypt the information being transmitted. Information may be exchanged between the NFC controller 130 and the NFC chip 125 within the device 105. When the NFC chip 125 is placed in close proximity to the controller 130, the controller 130 may enable an electromagnetic field to run through the NFC chip 125, thereby 'waking up' the chip 125 within the device 105. Specifically, the device 105 may be 'tapped' to the NFC controller 130. The chip 125 may be woken up by detecting the electromagnetic field via an antenna within the chip 125. The electromagnetic field may be created by a conductor within or in communication with the controller 130. The NFC controller 130 may provide an electromagnetic carrier field whereby the device 105 may draw operating power and charge the battery therein. The NFC chip 125 of the device 105 may, in response to having been woken up, may then transmit information stored in the chip 125 such as device identifiers, personal data, authentication data, financial data, account data, battery power data, etc. The information may be transmitted via an NFC protocol. By allowing the NFC controller 130 to power the chip 125, even if the battery of the device 105 is completely depleted, the chip 125 may still be used for authentication purposes, which are discussed below. The NFC controller 130 may include an NFC reader configured to read the NFC chip 125 and receive the device 105 information.

Figure 4:
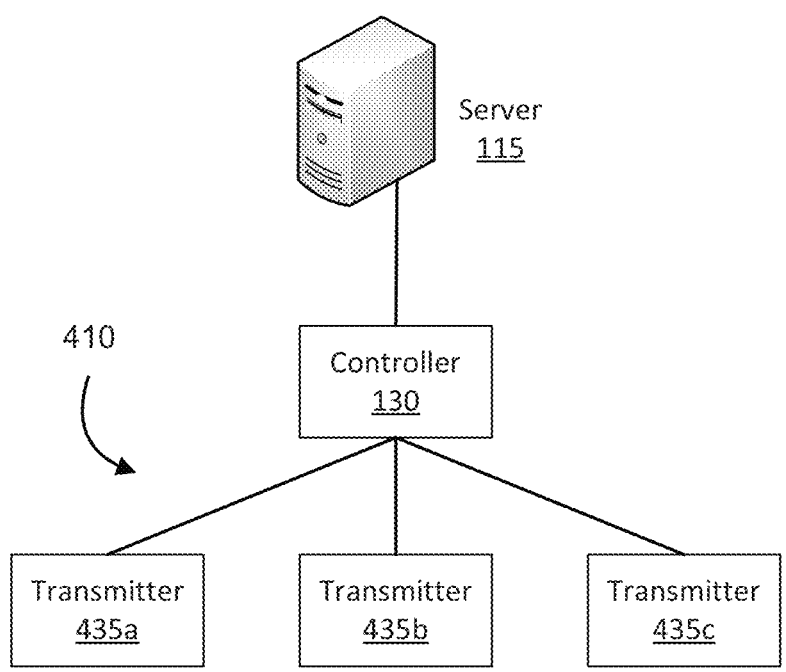
FIG. 4 is a system diagram of a charging system having multiple transmitters.

The transmitter 135 may be part of the charging system 110 and may be configured to charge the device 105. That is, the transmitter 135 and controller 130 may be part of the same device. The transmitter 135 and controller 130 may also be separate devices, as shown in FIG. 4. As explained, the transmitter 135 may include an induction coil configured to create an alternating electromagnetic field. The transmitter coil may be configured to resonate at the same frequency as the receiver coil within the device 105. This may create resonant coupling between the devices 105 and allow power to be transferred at a greater distance between the device 105 and the charging system 110. That is, the transmitter may charge a device in close proximity to it, but without direct contact. The transmitter 135 may receive commands from the controller 130 instructing the transmitter 135 to charge the device 105. That is, the transmitter 135 may create the electromagnetic field in response to instructions from the controller 130. The instructions may be in response to the controller 130 authenticating the device 105. As mentioned above, the controller 130 may include a conductor for creating a first electromagnetic carrier field for 'waking up' the NFC chip 125 Information may be received from the chip 125 via the first electromagnetic field, or it may be received via a secure out-of-band channel. The transmitter 135 may emit a second electromagnetic field for charging the device 105. The two fields may occupy different frequency ranges selected to avoid interfering with one another.

The transmitter 135 and the controller 130 may communicate with each other via a secure interface 140. The interface 140 may include an input/output system configured to transmit and receive commands and data between the transmitter 135 and controller 130. In an example where the transmitter 135 and controller 130 are separate devices (e.g., FIG. 4), they may communicate with each other using a wireless network such as Wi-Fi, Bluetooth, cellular networks, ad-hoc wireless networks, etc. The interface may be a one-way interface whereby the controller 130 transmits commands to the transmitter 135, as described herein.

The server 115 may be in communication with the charging system 110, and specifically in communication with the controller 130. The server 115 and the charging system 110 may communicate via a wireless network. They may also communicate with each other via a wire, land-line telephone network, cable network, fiber-optic cables, etc.

The server 115 may be a central office of a service provider. The service provider may provide services, (e.g., cellular, Wi-Fi, cable, FiOS, etc.) to the device 105. The server 115 may be configured to maintain a plurality of records associated with the device 105. These records may relate to a service agreement between the device 105 and the service provider and may include device identifiers, personal data, authentication data, financial data, etc.

The server 115 may be configured to further facilitate authentication of a device 105. In one example, the information received from the device 105 at the controller 130 may be sent to the server 115. Such information may include device identifiers, personal data, authentication data, financial data, account data, battery power data, etc. The server 115 may use the information to authenticate the user. That is, based on the device identifier, the server 115 may determine whether the device 105 should be authenticated or recognized based on the received information (e.g., device identifier). The record associated with the device may be used by the server 115 to determine the specific services associated with the device. Additionally or alternatively, the controller 130, upon receiving the information, may transmit the device identifier to the server 115. The server 115 may in turn respond with an authentication response detailing certain record and/or account data associated with the device identifier, such as the type of service/subscriptions the device subscribes to. This record data may be used by the controller 130 to determine whether the device 105 is authorized to be charged by the transmitter 135. The record data may include account data, such as subscription details, received payments, etc., as it relates to the device 105. For example, the account data may identify type of services associated with the device 105. In some examples, the account data may be used when authenticating a device 105. That is, the device 105 may be associated with a subscription for unlimited wireless charging. Other examples of subscriptions may include a certain amount (e.g., time) of charging. In other examples, it is enough that a pre-established relationship between the device 105 and the service provider exists, i.e., the device 105 receives at least some type of service from the service provider.

Certain subscriptions may also allow certain devices to receive preferential charging. This preferential charging may allow a device associated with a preferred subscription to be charged before another device association with a non-preferred subscription. For example, a user may pay for a preferred subscription. This subscription may include various services as discussed herein. The subscription may also allow the user to charge his or her device at various charging stations prior to other non-preferred subscribers. For example, if each transmitter 135 at a charging station is in use, and a queue of devices are waiting to be charged, the device associated with the preferred subscription may move up in the queue and be permitted to be charged prior to other non-preferred devices in the queue. The controller 130 may be capable of arranging a priority scheme so as to maintain the queue based on the status of each device 105. For example, subscribing devices may have priority over non-subscribing devices. Thus, a subscribing device may enter the queue ahead of a non-subscribing device. The controller 130 may be configured to update the queue as needed and provide alerts to any of the devices 105 currently in the queue when the status of the position of that device changes. For example, a non-subscribing device may receive a text message when a new subscribing device enters the queue, thus increasing the wait time for that specific device 105. Notifications may also be sent when a device 105 has left the queue. The notifications may include the estimated wait time until the respective device 105 could be charged.

The controller 130 may manage the queue and communicate with the devices via a wireless network. The controller 130 may send a message to a device indicating that the device may now begin charging at the transmitter 135. The message may be in the form of an SMS (Short Message Service) or MMS (Multimedia Messaging Server) message, and e-mail, etc. The order in which devices may be charged may be maintained by the controller 130 and/or the server 115. The account data associated with each device may define the subscription of each device. This account data may be used to determine the location of each device in the queue. In one example, if multiple devices are currently charging, and three other devices are line to charge, the three devices may be ranked or listed based on their subscriptions. A first device may be associated with a non-preferred subscription, while a second and third device may be associated with preferred subscriptions. Even if the first device has been waiting to be charged longer than the second and third, the second and third devices may be permitted to be charged before the first device.

As shown in FIG. 1, the device 105 may communicate with the charging system 110 using both out-of-band and in-band signaling. That is, two different channels may be used to communicate with the charging system 110. Such channels may be used to transmit an information signal from one device or medium to another. Each channel may have a certain bandwidth or frequency capacity to transmit signals. In the example shown in FIG. 1, out-of-band communications may be used to transmit NFC messages using the NFC protocol and an in-band electromagnetic field may be used to transmit the wireless power from the transmitter 135 to the receiver 120 of the device 105. In-band signaling allows for data to be sent within the same band or channel used for voice transmission. Out-of-band signaling is on a different channel and cannot be heard by users via the voice channel. Due to its security, data transferred over the out-of-band communications may be used for authenticating the device 105. In addition to authenticating the device 105, the NFC controller 130 may be used to 'wake up' the device 105. That is, once the NFC chip 125 of the device 105 enters the carrier field created by the NFC controller 130, the NFC chip 125 may be triggered, upon recognizing the field, to transmit device information to the controller 130. Thus, the carrier field acts as a wake-up signal for the device 105. The NFC controller 130, upon authentication, may then instruct the transmitter 135 to transmit power to the device 105. Because the carrier field is used to power and 'trigger' a response from the NFC chip 125, the device 105 does not need to periodically wake up and search for a transmitter 135. This allows power within the device 105 to be preserved. Moreover, if the battery of the device 105 is completely drained, the controller 130 may still authenticate the device 105 without requiring any power from the device 105. Accordingly, power transfer may be initiated via out-of-band communications and without drawing on the power of the device 105.

The device information may be transmitted initially via an out-of-band channel. As explained, a user may be authenticated using the NFC protocol. Further, once the power transfer has been initiated, information may continue to be intermittently transmitted via the out-of-band channel. That is, the NFC chip 125 may continue to transmit device information, including a device identifier to the controller 130 at intermittent intervals. By continually transmitting the device information during charging, the charging system 110 may be assured that an authenticated device 105 is using the transmitter services. That is, out-of-band communications may be transmitted while a device 105 is being charged via in-band magnetic resonance. Additionally or alternatively, as described herein, in-band communication may also be used to receive the device information.

By using out-of-band communications to initially recognize the device 105, problems with detecting the device 105 are alleviated. First, if the battery of the device 105 is sufficiently depleted, the device 105 may not be capable of sending or receiving ping commands to detect a trigger. The NFC controller 130 provides enough power to the NFC chip 125 so that the chip 125 may be read and therefore may 'wake-up' the device 105, instead of the device 105 waking up on its own to look for a transmitter autonomously. Further, when using in-band communications, a relatively large load may be placed on the transmitter 135 by the device 105. That is, the charging of the device 105 may create a large draw on the transmitter 135 and may prevent other devices from being detected. For example, a Bluetooth™ device has a relatively small load in comparison with a phone. If a phone is being charged via an in-band channel, the transmitter 135 may not be capable of detecting a device that makes use of the transmitter 135 but at a lower load. Thus, when multiple devices 105 are in close proximity to a transmitter 135, some may be essentially undetectable due to the large load caused by the in-band charging. By using an out-of-band channel to transmit information to authenticate each device, the device may be recognized and may in turn be charged by the transmitter 135, or multiple transmitters.

The device 105 may continue to be charged by the transmitter 135 until a trigger event occurs. The trigger event may be any event that is recognized by the controller 130 and may cause the controller 130 to instruct the transmitter 135 to cease charging. In one example, the trigger event may not be specific to the device 105—e.g., time based such that charging is allowed only for predetermined periods per use, independent of the device characteristics once the device is authorized. In one example, the trigger event may be specific to the device 105, e.g. that the device 105 is fully charged. That is, the battery within the device 105 has reached its maximum power capacity. This may be detected by the controller 130 via the device information transmitted via the out-of-band communications. Additionally or alternatively, the controller 130 may receive such indication that the battery is fully charged, or at least charged to a predefined amount set by the user, via the in-band channel. Further the controller 130 may maintain and enforce other limitations other than battery capacity. In one example, the controller 130 may instruct the transmitter 135 to stop charging when a time limit has been reached. Such time limits may be imposed based on the service arrangement with the service provider and further may be variable, e.g., depending on the number of devices waiting to be charged. The controller 130, as explained, may receive this information from the server 115 and use it to limit the power transmission by the transmitter 135.

Another example of a trigger event specific to the device 105 may be the expiration or limit on charging services as defined in the record data associated with the device 105. For example, some records may establish a certain duration, or quantity of permitted charges. In one example, a device 105 may be permitted to be charged for up to 10 hours a month. Once the limit is reached, charging may not be authorized or additional fees may be incurred. The amount that a specific device 105 has been charged may be calculated based on the start and end times recorded by the controller 130. Each time a device 105 is tapped to the charging system 110, it may transmit a timestamp to the network or controller 130 and/or store the timestamp. The various timestamps may be maintained in the device record at the server 115. Additionally or alternatively, the controller 130 or device 105 may maintain its own record.

A trigger event may also be recognized when the device 105 is no longer authenticated. During charging, the NFC controller 130 may read the NFC chip 125 at predefined intervals. Each time the NFC chip 125 is read, the device information is evaluated. If the NFC controller 130 ceases to authenticate the device 105, the controller 130 may instruct the transmitter 135 to stop charging. This may occur when the device 105 has been removed from the charging system 110. By routinely authenticating the device 105, it prevents the device 105 from being removed from the charging system 110 and another subsequent device 105 taking its place. That is, it prevents an unauthorized device from 'stealing' power from the transmitter 135.

The continual authentication may also be done via in-band signals transmitted over an in-band channel during charging. That is, the device information may be transmitted over the in-band channel instead, or in addition to the device information received over the out-of-band channel. The information sent over the in-band channel may be similar to that sent over the out-of-band channel in that it may include a device identifier and other battery and charging information. The transmitter 135 may be configured to recognize the device identifier and maintain charging as long as the identifier remains constant. In addition to continually authenticating the device 105, the in-band information may be used to inform the transmitter 135 of certain power properties of the device 105 such as the remaining battery power, necessary currents for charging, etc. However, any financial information typically transmitted via NFC may not be sent via the in-band channel, being instead reserved for the more secure out-of-band channel. Further, payment information may not need to be sent via a secure channel if the information may be determined by a predefined relationship between the device and the service provider (e.g., an account or subscription.) In such instances, the mobile number associated with the device may be transmitter outside of a secure channel and may identify the payment information at the service provider.

In addition to various authentication advantages, the system 100 also provides for enhanced billing and payment options. In one example, as described above, the subscription between the device 105 and the service provider may include wireless power transfer at various charging systems 110. In one example, the service provider may have charging stations in public places such as airports, hotels, shopping centers, banks, etc. The charging stations may allow users to charge their devices 105 at certain kiosks. The user's subscription with the service provider may include these services. Thus, upon authentication, the device 105 may be charged by a transmitter 135 at the charging station. Additionally or alternatively a bill-through system may be enabled by the service provider and charging station. That is, a per-use fee may be incurred for charging. Such fee may be applied to the monthly statement associated with the device 105. Other methods of payment may also be used. In one example, the NFC controller 130 may also be used to authorize payment of the charging service. Regardless of whether a pre-established relationship exists between the device 105 and the server 115, upon tapping of the device 105 to the controller 130, the user of the device 105 may be asked, via a user interface within the device 105, if he or she would like to pay for the charging service with his or her credit card or bank card stored in the NFC chip 125. Thus, non-subscribing devices may also use the charging services, perhaps at an enhanced fee, compared to currently subscribed customers.

Figure 2:
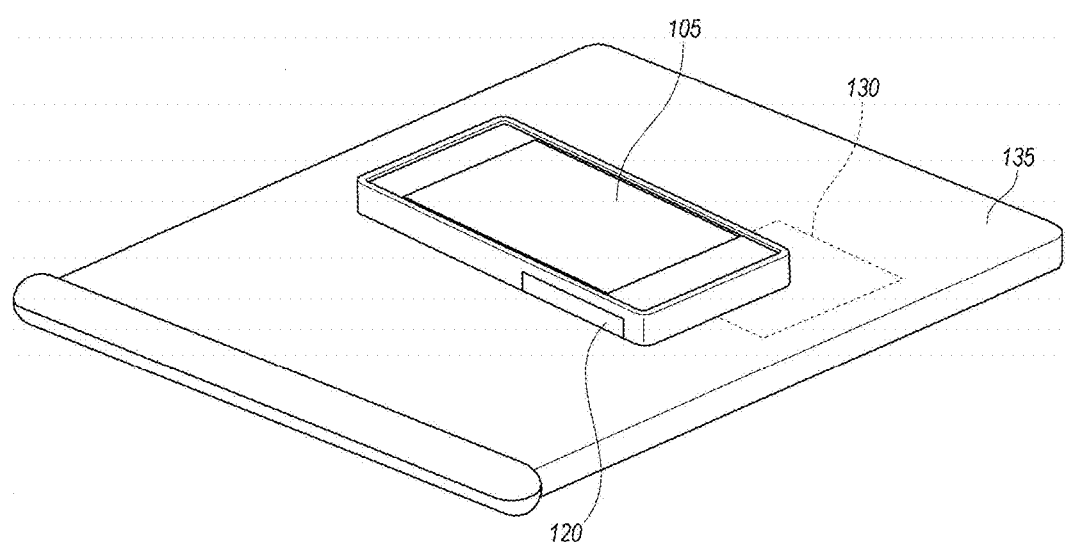
FIG. 2 is a perspective view of an exemplary wireless charging system.

FIG. 2 shows the device 105 being in direct contact with the charging system 110 so that the coil of the receiver 120 is in contact with the transmitter 135. The NFC chip 125 within the device 105 and the NFC controller 130 may also be in contact with one another. However, while the transmitter 135 and the device 105 are shown to be in contact with one another, charging may still occur without the contact. The transmitter 135 may still charge the device 105 as long as the device 105 is within range of the electromagnetic field transmitted by the transmitter 135.

Figure 3:
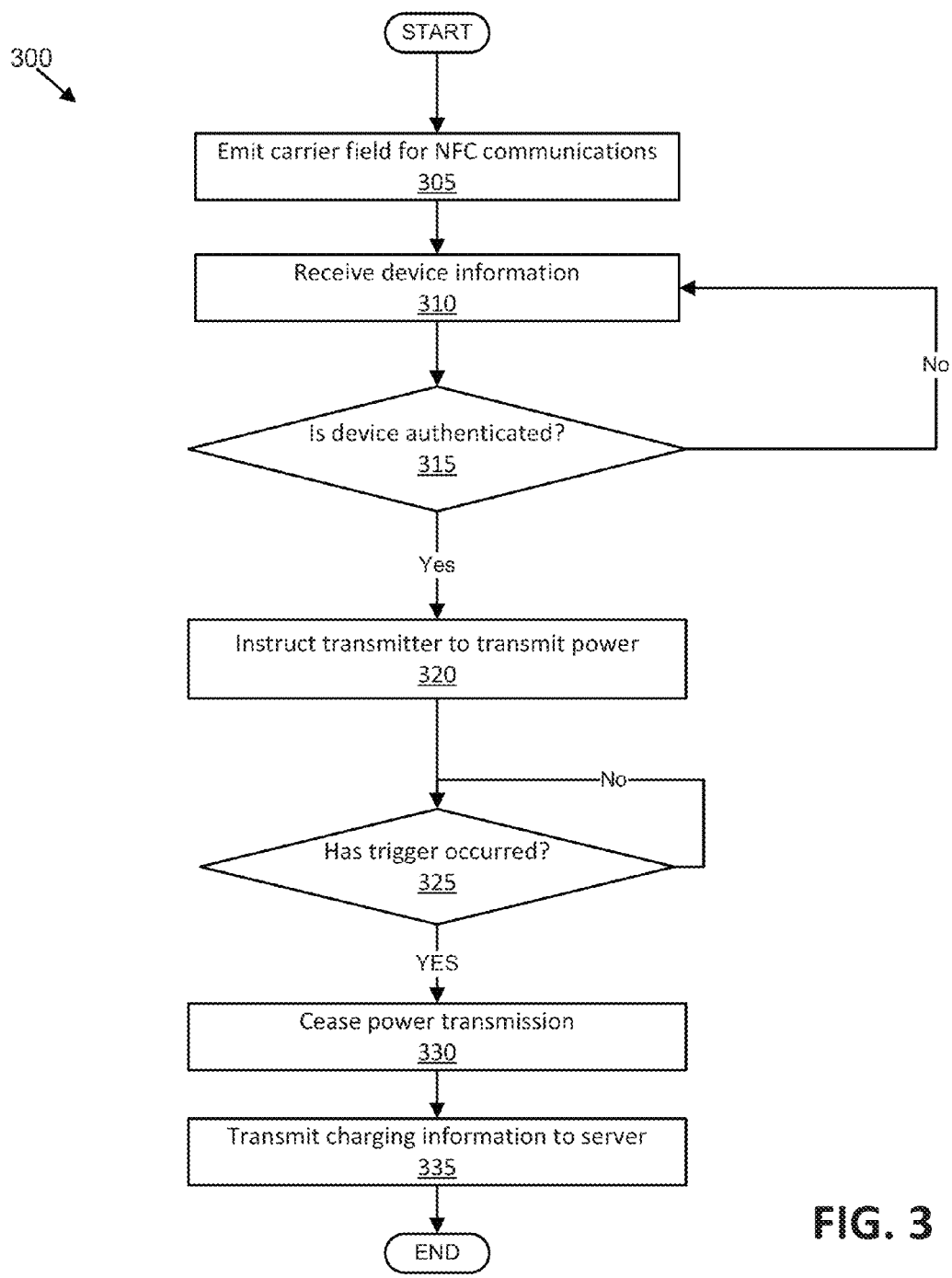
FIG. 3 is a flow chart for an exemplary process for the charging system.

FIG. 3 shows an exemplary process 300 for the system 100. The process 300 begins at block 305. In block 305, the NFC controller 130 emits an electromagnetic carrier field. The device 105 may be 'tapped', or touched, to the NFC controller 130. By doing this, any NFC element, e.g., NFC chip 125, which comes in contact with, or at least in close proximity to, the NFC controller 130 is able to recognize the field and become a transponder capable of being powered by the carrier field. As explained above, this allows the device 105 to be 'woken up' by the carrier, or first electromagnetic field without the device 105 having to periodically wake up and search for a transmitter 135.

In block 310, the controller 130 may receive device information from the device 105 via the NFC chip 125 within the device 105. The NFC controller 130 may acquire device information from the chip 125, which may include device identifiers, personal data, authentication data, account data, financial data, battery power data, etc. This information may be received via a secure channel using out-of-band communications.

In block 315, the controller 130 determines whether the device 105 is authenticated. The device 105 may be authenticated based on the device identifier. It may be enough that the controller 130 recognizes the device identifier as being associated with the service provider. The controller 130 may also use the device identifier to look up the record data and subscriptions associated with the device 105. In one example, the controller 130 may transmit the device identifier to the server 115. The server 115 may then return the record associated with the device 105. The controller 130 may determine whether the device 105 may be charged based on the device record. For example, the device 105 may be authenticated for charging based on the subscription associated with the device 105, e.g., unlimited wireless power transmissions. The subscription may also set forth certain geographical limits as well as durational limits. In one example, the subscription may permit for charging in certain geographical locations, e.g., domestic airports, but not others, e.g., international airports.

If the subscription does not include wireless power transfer, the user may authorize such wireless power transfer by paying a fee for the transfer. This fee may be paid using bill-through whereby the fee is applied to the monthly statement associated with the device 105. The fee may also be paid using a credit card or bank card established with the NFC chip 125 or the secure element. The user of the device 105 may authorize such payment via the user interface. For example, in the event that the subscription does not include wireless power transfer, the interface may display a message such as "Wireless power transfer is out of the scope of subscription, would you like to pay for the transfer?" If the user responds in the affirmative, the user interface may generate a list of payment options, such as service provider bill through, NFC authorized charge, or another electronic payment type. If the user of the device 105 decides to pay for the wireless power transfer, the device 105 may then be considered to be authenticated.

Once the device 105 is authenticated, a notification may be realized either at the charging system 110 or at the device 105. In one example, the charging system 110 may emit a sound via a speaker in the system. In another example, the device 105 may pulse, or vibrate. These notifications may provide an indication to the user that authentication has been achieved. Notification may also be realized via the user interface, e.g., via an SMS or email message or on the display via an API stating "Device Authenticated."

The process 300 may proceed to block 320. If the device 105 is not authenticated, the process 300 may return to block 310 until further device information is received.

In block 320, in response to the device 105 being authenticated, the controller 130 may instruct the transmitter 135 to transmit power to the device 105. Power may be transmitted by the coil within the transmitter 135. The coil in the receiver 120 of the device 105 may receive the power and in turn, store the power via the device battery. The power transfer may be facilitated by a second electromagnetic field created by the coils. The second electromagnetic field, as explained above, may be received by a device receiver 120 and used to charge the battery may then be charged using the power from the transmitter.

In block 325, the controller 130 may determine whether a trigger event is recognized. As explained above, a trigger event may be any predetermined event that causes the transmitter 135 to cease its power supply. Exemplary triggers may be battery capacity being reached, time limit being reached, or loss of authentication of the device 105. The controller 130 may receive out-of-band communications from the device 105 in the background of the power transfer. That is, the out-of-band NFC communications may use an additional channel outside of the in-band channel and will not interfere with the power transfer. Additionally or alternatively, in-band signals could be relied on for detecting the trigger event. For example, the battery capacity may be communicated to the transmitter 135 via in-band channel, as well as the device identifier.

In addition to the examples above, a break in power transmission may also be a detectable trigger event. If a device 105 were to be removed from the transmitter 135, the transmitter 135 may detect the loss of resonance and therefore cease to supply an electromagnetic field. Once this occurs, the device 105 may be required to be re-authenticated by the controller 130 before power transfer may resume. This may prevent a device 105 from leaving the transmitter 135 and being replaced by another, non-authorized device.

If a trigger event has been detected, the process 300 proceeds to block 330. If not, the process 300 continues to charge the device 105 and stays at block 325.

In block 330, the controller 130 instructs the transmitter 135 to cease power transfer. The transmitter 135 may enter a sleep mode until the transmitter 135 is again woken up by the controller 130 and instructed emit power.

In block 335, once power transfer has ceased, charging information may be transmitted to the server 115 by the controller 130. Additionally or alternatively, the controller 130 may maintain the charging information. The charging information may include certain information such as the start and stop time of the charging session. It may also include the selected payment type (if any), as well as other device specific factors such as throttling information (e.g., the variances in how a battery is charged wherein it may charge quickly at first and slow down as capacity is reached.)

The process 300 then ends.

FIG. 4 is an exemplary diagram of a charging system 410 having multiple transmitters 435 in communication with the controller 130. In this exemplary system 400, one controller 130 may be configured to control multiple transmitters 435. For example, transmitters may be embedded at a charging station at an airport. These charging stations may have one NFC controller 130 and multiple transmitters 435 so that multiple devices may be charged simultaneously. The transmitters 435 may be arranged under tables or seats within the airport terminals.

In operation, a user may 'tap' his or her device 105 at the controller 130. Once the device 105 has been authenticated, a notification may be realized (e.g., chime, vibration, message on the device interface) indicating that the user may proceed to place the device 105 on one of the transmitters 435. It may not immediately be known to the charging system 410 which transmitter 435 will charge the device 105. In one example, the device 105 may be charged at an available transmitter 435 not currently being occupied by another device. In another example, one transmitter 135 may actually include multiple transmitters. That is, a single charging plate may include multiple transmitter coils each configured to receive a device 105.

Because the NFC controller 130 does not necessarily know which transmitter 135 will eventually charge the device 105, several methods may be used to ensure the device 105 is charged, without allowing un-authorized devices to 'piggy back' the power transfer. That is, authenticating one device will not allow multiple devices to be charged simply because there are additional available transmitters. In one example, once the device 105 is authenticated, the controller 130 may instruct the transmitters 435 to emit power. However, the authenticated device 105 may be placed on only one of the transmitters 435, such as transmitter 435a. Upon being placed on the transmitter 435a, the coil of the receiver 120 within the device 105 being to receive power. The transmitter 435a may be configured to detect that the receiver 120 is receiving power by the resonance created by the two coils. The transmitter 435a may continue to transmit power until a trigger event is detected. In this example, where the device 105 is not within NFC range of the controller 130, the trigger event may be removal of the device 105 from the transmitter 435. That is, the transmitter 435a may be configured to emit power as long as a device 105 is in resonance with the transmitter 435. Once resonance is broken, the device 105 may need to again be authenticated to resume power transfer.

In another example, the transmitters 435 may emit electromagnetic fields for a predetermined amount of time after authentication, e.g., for 30 seconds. Once that time has expired, if the transmitter 435 has not received device information associated with the device 105 via the in-band channel, power transmission may cease. That is, unless the device 105 is recognized by a transmitter 435, the transmitter may turn off and enter sleep mode.

Each transmitter 435 may be capable of recognizing resonance individually of the other transmitters 435 associated with the controller 130. That is, the lack of resonance at one transmitter 435 may act as a trigger event for that transmitter 435, without affecting the others. In the above example, where the device 105 is authenticated, all of the transmitters 435 may begin to emit an electromagnetic field. The device 105 may be placed on the transmitter 435a. After a predetermined amount of time has passed, resonance may not be detected at transmitters 435b and 435c and they may cease to emit power. Thus, the trigger event is independent for each transmitter 435. This may decrease the possibility of non-authorized power transfer.

By having one controller 130 associated with multiple transmitters 435, costs may be reduced and efficiencies may be increased. For example, only one controller 130 may be configured to be in communication with the server 115. However, with each authenticated device 105, the transmitters 435 may emit power and allow for multiple devices 105 to be authenticated by a single controller 130 and charged concurrently.

Accordingly, a NFC enhance wireless charging system 110 is disclosed whereby it is not necessary for the device 105 to continually 'wake-up' to detect a transmitter 135. A dual-band system allows for the device 105 to be recognized and authenticated via NFC technologies using out-of-band communications. Moreover, once authenticated, the controller 130 may instruct the transmitter 135 to charge the device 105. The device 105 will be charged until a trigger event is detected, at which the controller 130 with instruct the transmitter 135 to cease charging. Service provider bill through and subscriptions may be used to generate a fee for the charging services. Additionally, other NFC enabled payment mechanisms, such as credit cards and bank accounts may be used to pay for the charging service.

Referring back to FIG. 2, the device 105 may be placed on transmitter 135 to receive power from the transmitter 135. Due to the location of the receiver 120 within the device 105, the efficiency of charging the device 105 may be affected by the location of the device 105 on the transmitter 135. That is, a coil of the transmitter 135 may not line up with a coil of the device receiver 120, reducing efficiency and thereby increasing power loss during the power transfer. To best augment power transfer, the receiver coil and the transmitter coil should be aligned with one another. In order to determine whether the two components are aligned, the electromagnetic field created between the two components may be compared with a predefined field strength. The greater the field strength, the better the communication between the two components and thus the better the authentication and power transfer. The field strength may be indicative of a three dimensional distance between the two components. Ideally, the two components will be touching, or nearly touching. That is, the device 105 may be placed directly on the charging system 110 so that the receiver 120 and transmitter 135 are on top of one another (i.e., aligned with one another).

While power transfer may occur between the receiver 130 and transmitter 135 without precise alignment, the system is most efficient when a greater degree of alignment is achieved. Further, to most accurately authenticate a device 105, the NFC chip 125 of the device 105 and the NFC controller 130 should be aligned. In order for NFC to work, the NFC components must be in close proximity to one another.

Users often become frustrated when they cannot find a 'sweet spot', or optimal device position when placing their devices 105 on the charging system 110. A system may be provided to align the NFC chip 125 of the device 105 with the controller 130 of the charging system 110, as well as align the receiver 120 of the device 105 with the transmitter 135 of the charging system 110, to increase user satisfaction and efficiency during wireless charging. The described system may allow for the user to receive feedback regarding the optimal position of the device. In one example, visual, auditory and/or tactile feedback may be provided to optimize alignment of the NFC chip 125 with the controller 130, increasing efficiency for initial transfer of the in-band information and reducing the likelihood of having to repeatedly move around to find a position of adequate alignment. In order to find the optimum alignment, the user interface on the device 105 or controller 130 may provide guidance to allow the user to know how close the device 105 is to the optimum position. That is, the user interface may indicate the proximity of the device 105 with respect to the controller 130 or transmitter 135. The proximity may indicate multiple dimensions with respect to the controller 130. For example, the interface may indicate the proximity in an x/y/z direction. Additionally or alternatively, the charging system 110 may auto-configure the coil/transmitter 135 within the charging system 110 to an optimal transmitter position underneath a device's receiver 120.

Figure 5:
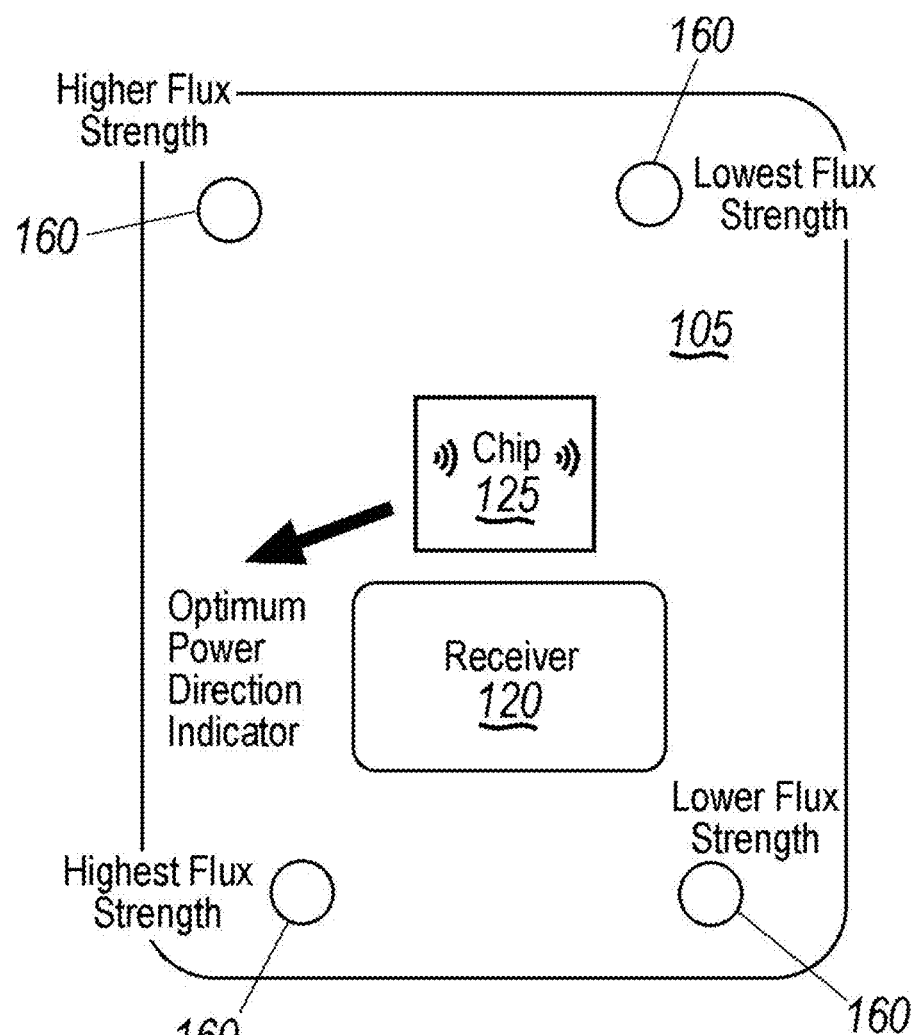
FIG. 5 is a system diagram of a device having sensors enabling optimized positioning of the NFC interactions.

Referring now to FIG. 5, an exemplary device 105 with NFC chip 125 and a charging coil 170 is shown. The NFC chip 125 is shown as being located in the center of the device 105, but may be located anywhere therein. As explained above, the NFC chip 125 may be capable of transmitting information to other NFC devices, such as controller 130. The NFC chip 125 may be powered by the electromagnetic field created by the controller 130. Upon being woken up by the controller 130, the NFC chip 125 may then transmit authentication information to the controller 130. However, in order to transmit information to the controller 130, the NFC chip 125 within the device 105 must be at least substantially aligned with the controller 130 of the charging system 110. Ideally, by aligning the controller 130 and the NFC chip 125, the receiver 120 and transmitter 135 will also align, thus increasing the power transfer therebetween. In order to align the two components, the charging system 110 may detect the location of the device 105. This may be done using one of various approaches and supporting components.

In one example, the strength of an electromagnetic field created between the device 105 and the controller 130 may be determinative of the location of the device 105 relative to the transmitter 135 of the charging system 110. As explained above, an electromagnetic field may be created between the controller 130 and the chip 125, as well as the receiver 120 and the transmitter 135. Each of these fields may be used to determine the location of the device 105. The stronger the electromagnetic field, the closer the device 105 is to an optimal device position.

In one example, the controller 130 of the charging system 110 may determine the field strength. In another example, the receiver 120 of the device 105 may determine the field strength. In the former example, the controller 130 may detect the field strength of the field created when a device 105 is placed on the charging system 110. The controller 130 may assign a field strength indicator based on the field strength. This indicator may be used to determine whether the device 105 is at an optimal device position by comparing the indicator with a predefined signal strength. Such comparisons and determinations may be done in the controller 130, or another controller or processor associated with the charging device 110. The predefined signal strength may be a signal strength that would indicate that a device component (e.g., chip 125 or receiver 120) and a charging system component (e.g., controller 130 or transmitter 135) are in close proximity to one another so that authentication and/or charging may occur efficiently.

In the example where the device 105 determines the field strength, the strength of the field or signals received from the charging system 110 may similarly indicate the position of the device relative to the components of the charging system 110 (e.g., the position relative to either the NFC controller 130 and/or the transmitter 135.) The device 105 may also determine a field strength indicator and compare it against a predefined signal strength.

Thus, if a weak field is detected, the device 105 may assume that the device 105 is not at an optimal device position. On the other hand, if a strong field is detected, the controller 130 may assume the device 105 is at, or close to, the optimal device position. The optimal position is the location of device 105 relative to the charging system 110 such that the NFC chip 125 and the controller 130 are physically on top of one another. The optimal device position may also be one where the receiver 120 and transmitter 135 are physically aligned with one another, or that at least a portion of the components align. In an ideal situation, the NFC components (controller 130 and chip 125) and the power transfer components (transmitter 135 and receiver 120) both align concurrently.

As explained, the device 105 may detect a field from either the controller 130 or the transmitter 135. Each of these may have different attributes that may affect the position determination. For example, a field created by the controller 130 may form an out-of-band communication and may be a relatively weak field because it is intended only for near field communications. Alternatively, the field created by the transmitter 135 may be an in-band communication and may have a stronger field due to the necessary power transfer. The device 105 may be capable of distinguishing between the two fields. The device 105 may maintain separate predefined field strengths for each type of field and apply those thresholds to the field strength indicator to determine whether the device is in an optimal position or not. For example, if the field strength indicator meets or exceeds a predefined strength, the device may be determined to be in an optimal position at least because it has detected a strong signal strength. Similar methods may be used by the charging station 110 to determine the relative position of the device 105. Additionally or alternatively, the controller 130 may determine the position of the device 105 and transmit this position information to the device 105. The device 105 may then use this position information to provide feedback about the position. The position information may be continually updated so as to provide the user with real-time or near real-time feedback as to the position of the device.

Moreover, while it is described above with respect to FIG. 3 that the device 105 may first be authenticated before the transmitter 135 may transmit power to the receiver 120, the transmitter 135 may supply an initial B-field to be detected by the receiver 120 prior to authentication. This initial B-field may allow the device 105 to determine its location relative to the location of the transmitter 135 and be adjusted accordingly in response to the feedback regarding the same.

Upon detecting a field strength and subsequently the position of the device relative to the charging system 110, the system may provide feedback to the user of the device 105 via a feedback mechanism on either one or both of the device 105 and charging system 110. This feedback may aid the user in finding the optimal device position. It may also inform the user once the optimal position has been achieved, as well as when authentication has been achieved. In one example, the feedback mechanism may be the device interface. Such feedback may include a graphical and/or pictorial indication of the intensity or strength of the field, such as a growing circle, a power bar, signal level digits (e.g., 0-100%), arrow indicating the direction to move the device 105 relative to the charger 110, etc. For cases where the device 105 is in standby mode or is off (e.g., the battery is depleted), an LED (Light Emitting Diode) on the device 105 may be used to indicate the position status. For example, a power LED indicator or another "NFC" LED indicator may be used. As the user moves the handset through the electromagnetic field, the LED may change intensity, colors, and/or blink rate to indicate the "hot" or "cold" spot of the field. Similarly, the device 105 may emit sound whose volume and/or frequency reflects such alignment. Additionally or alternatively, the charging system 110 may also include an indicator mechanism such as a display or LED to communicate the device position to the user. By communicating the status of the position of the device 105, a user may easily achieve an optimal position and thus benefit from NFC and wireless charging technologies.

In addition to the field strength indicator being used to determine a device position, other approaches may also be used. In another example, additional sensors may be used to determine the position of the device 105. Referring again to FIG. 5, a plurality of device sensors 160 may be arranged within the device 105. As shown in FIG. 5, the device sensors 160 may be arranged at or near the four corners of a device, but such sensors 160 may also be arranged anywhere within the device 105, including around the periphery of the device 105. The most strategic placement of the sensors 160 may be around the outer periphery of the device 105 so that the sensors may detect the various fields at its outermost points. The sensors 160 may be heat or magnetic flux sensors configured to detect the magnetic flux at each sensor and specifically detect the difference in flux across each sensor. That is, as the device 105 is moved atop the charging system 110, the sensors 160 may detect the difference in flux amongst them. For instance, the top right sensor may detect a stronger flux than the bottom left, thus indicating that the top right sensor is closer to the coil/transmitter 135 of the charging system 110 than the bottom left. This determination may then be indicated to the user of the device 105 via the user interface, or other mechanism described herein, to inform the user of an ideal placement of the device 105 on the charging system 110. The user may in turn guide the phone accordingly along the surface of the charging system 110. In this case, if the device 105 is on, the user interface may indicate field strength plus a directional indicator of increasing field strength. Again, if the device 105 is off, LED indicators can be used. With the directional indicator, the user can move the device towards the direction of increasing field strength. The LEDs shown in the different corners of device 105 may have the same color or may be different colors that indicate increasingly better alignment by lighting e.g., red, orange, yellow, green. In some embodiments the LEDs remain activated with progressively better alignment (and deactivate with progressively poorer alignment), while in other embodiments only the LED corresponding to the alignment precision is activated so that only one LED at a time is on. In some embodiments, the order of the LEDs lighting to show signal strength may be different from that described above, such as clockwise or counterclockwise. In some embodiments, a tone may accompany the lighting of each LED, with each tone being the same or depending on the LED being lit. In other embodiments, the LEDs may be positioned proximate to an edge but not necessarily at the corner of device 105, e.g., adjacent to a border of device 105.

In one illustrative approach, the sensors 160 may specifically be Hall Effect sensors. Such sensors may detect the magnetic field created at the charging system 110. As explained, by detecting the field emitted from the charging system 110, the device 105 may determine a general location within the charging system 110 of the transmitter 135 and/or controller 130. The sensors 160 may determine the strength of the electromagnetic field at each sensor 160. The signal strength may be represented by an output voltage from the sensors 160. The device 105 may interpret the signal strength by comparing the various signals strengths acquired from each of the sensors 160. The device 105 may use this information to determine which direction the device 105 should be moved in order to move closer to an optimal position. Other sensors, such as an accelerometer, gyrometer, and/or magnetic sensor may also be used to detect the device directional motion in relation to rate of change in flux density. The magnetic field strength decreases with distance and is inversely proportional to $r^3$, where r is distance from the source (e.g., transmitter 135 or controller 130.) This information can be used to enhance the detection of the source in relation to the device. As explained, the controller may transmit a field strength indicator of a first electromagnetic field and/or position information to the device indicating the location of the controller 130 relative to the NFC chip 125 of the device 105.

In the example shown in FIG. 5, the device 105 has determined that the two left most sensors have detected the higher flux strength over the right most sensors. Thus, moving the device towards the left would move the device 105 towards the source of the field (e.g., transmitter 135 or controller 130). In an example where sensors 160 are located at each of the four corners of a device, the device 105 may be considered to be an optimal position when the flux detected by all four sensors is nearly equal, thus indicating that the device is centered upon the appropriate portion of the charging system 110.

The position of the device 105 may be represented and visualized using a coordinate system (not shown) such as a Cartesian coordinate system having an x-y-z axis capable of identifying an area of the charging station 110 using coordinates thereof upon which the chip 12 of the device 105 is currently located. The controller 130 may use the same x-y-z axis to define the optimal device position. Position information transmitted to the device 105 from the controller 135 may include specific coordinates outlining the area of the device 105 or components thereof. The controller 130 may also recognize the coordinates and be capable of associating coordinates with a given device position. The device 105 and/or the charging system 110 may use such coordinates to determine the alignment of the various components. For example, if the controller 130 has a position represented by (C1, C2, C3), and the NFC chip 125 has a position of (D1, D2, D3), the two positions may be compared to determine the difference in their positions (e.g., (C1-D1, C2-D2, C3-D3). The device 105 may use the difference in the two positions to further guide the placement of the device on the charging system 110. In yet another example, if the components are misaligned, the controller 130 or device 105 may have a predefined tolerance that is permissible. That is, as long as the difference in the two positions is within the tolerance, then the user interface may indicate that the position of the device 105 is acceptable. Even further, the surface area of the components may be taken into consideration when determining alignment. In one example, a ratio of the surface area and the misalignment may be compared against a tolerance to determine if the components are in alignment.

As described in more detail below, the controller 130 may use the identified device position to configure the transmitter 135 to the same position.

Figure 6:
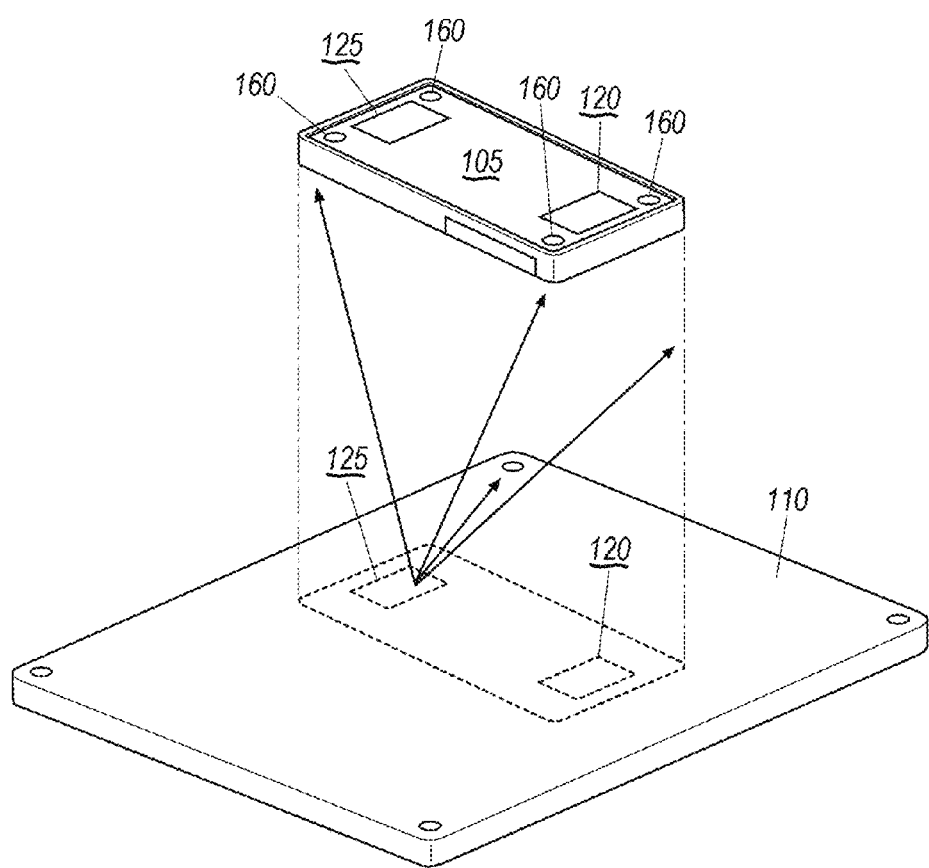
FIG. 6 is an exploded a system diagram of the wireless charging system.

FIG. 6 shows an exploded view of the device 105 located above the charging system 110 with the placement of the device 105 on the system 110 shown in phantom. The device 105 may detect a magnetic field emitting from the charging system 110 either at chip 125 or sensors 160. The device 105 may in turn, provide continuous guidance to the user on where to place the device 105 on the charging system 110. In addition to guiding the device to the appropriate position, the feedback may also indicate to a user when the device is in the optimal device position, as well as when the device has been authenticated, charged, etc., in order to provide a better experience to the user during charging.

Figure 7:
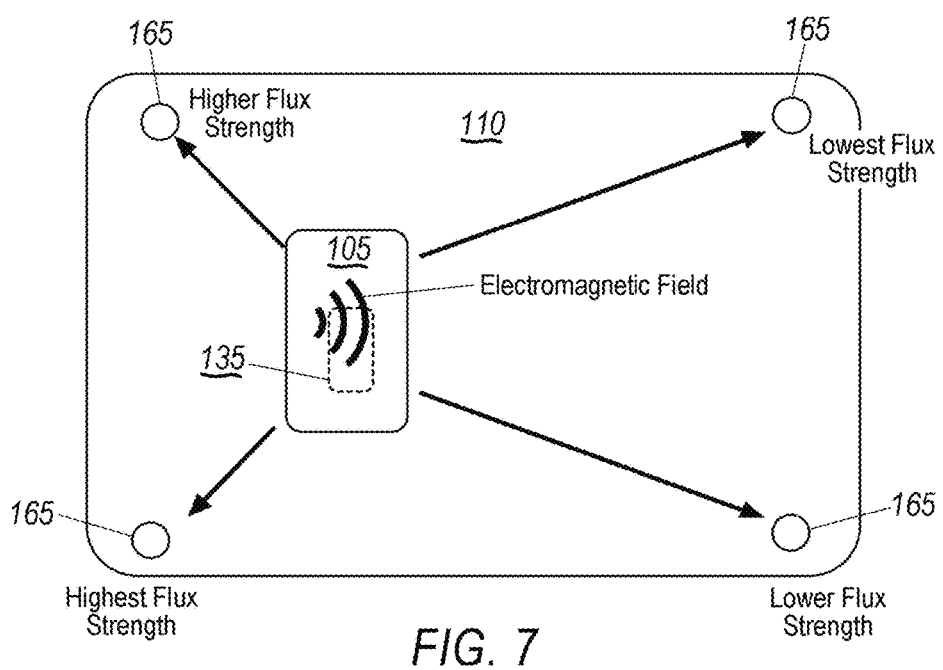
FIG. 7 is a system diagram of a charging station having sensors enabling optimized positioning of a transmitter.

FIG. 7 shows an exemplary charging system 110 having plurality of charging system sensors 165 similar to the magnetic flux sensors 160 described above. The charging system sensors 165 may be located at the four corners of the charging system 110, but may be located anywhere within the charging system 110. For example, the sensors may be located in a circular pattern extending radially outwardly. Moreover, more than four sensors may be used. The sensors 165 may be used to detect the strength of the magnetic field created by the device 105, thus detecting the device position on the charging system 110. Once the position of the device 105 is determined, the charging system 110 may configure the transmitter to an optimal transmitter position underneath a device's receiver 120. The device position may be determined regardless of whether an optimal device position has been achieved. In one example, the determination may be made in response to the device optimal position not being achieved. That is, the transmitter 135 may be adjusted to better facilitate charging of the device 105 in the event that the device 105 was unable to find its optimal position relative to the transmitter 135. In another example, position of the transmitter 135 may be adjusted to further increase the efficiencies of the charging system 110. That is, not only may the device be configured to find an optimal 'sweet spot', but the transmitter 135 may also do the same to further ensure efficient power transfer. Regardless of when the device position is determined by the charging system 110, any field emitting from the transmitter 135 may be turned off prior to the transmitter 135 being reconfigured. That is, the B-field emitted from the transmitter for purposes of finding the optimal device location may be turned off so that the transmitter 135 may be configured to its optimal transmitter position.

Figure 8A:
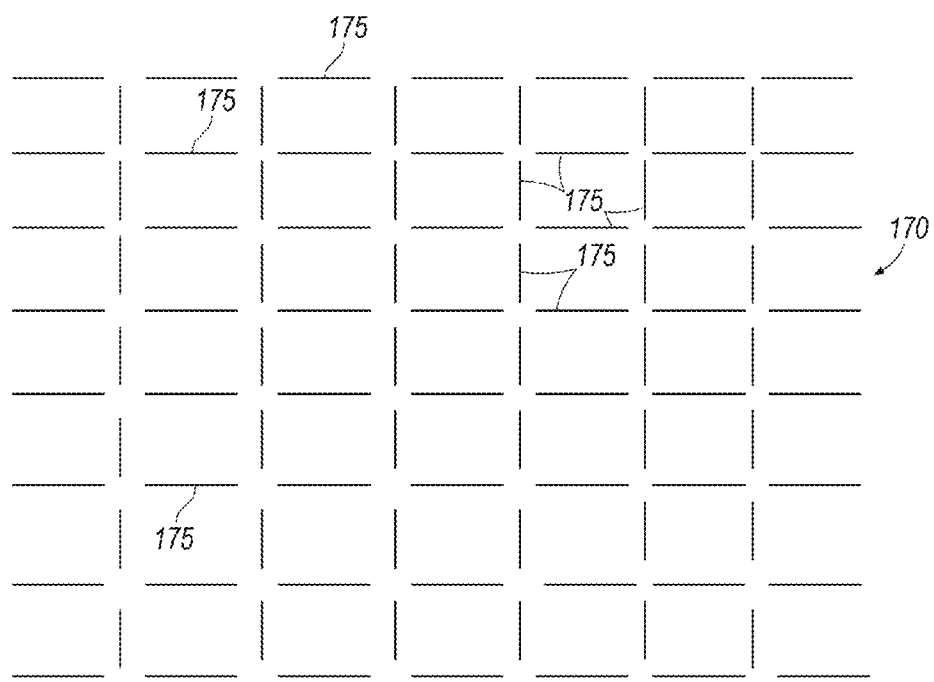
FIGS. 8A-C are exemplary components of an interconnectable grid for creating a dynamic transmitter.

Several mechanisms may be used to alter the location of the transmitter 135. In one example, as shown in part in FIG. 8A, the charging system 110 may include an interconnectable grid 170 facilitated by various conductive pathways, such as traces 175, and switches 180 (shown in FIG. 8B) configured to connect the traces 175. The grid 170 may be formed on a circuit board which may include a plurality of layers. The layers of the grid 170 may include a grid layer for housing the traces 175, a control layer housing the switches 180, and a connection layer. Although these layers are described as separate layers, these layers may be combined. The traces 175 within the grid layer may create a grid-like architecture and may be any type of conductive material such as copper. The switches 180 may be arranged in the control layer for connecting the individual traces 175 to form a coil (e.g. a dynamic transmitter 135). The switches 180 may be any type of solid state switches controlled by a control signal at the control layer. Analog switches may be used, or any other type of switch capable of quickly forming a connection between the traces 175. The control signal may come from the controller 130 or another controller in communication with the grid 170. The control signal may also come from a processor within the charging system 110 or a digital chip within the grid 170. The control signal may instruct the necessary switches 180 to be thrown in order to create a transmitter 135 at an optimal transmitter position.

Figure 8B:
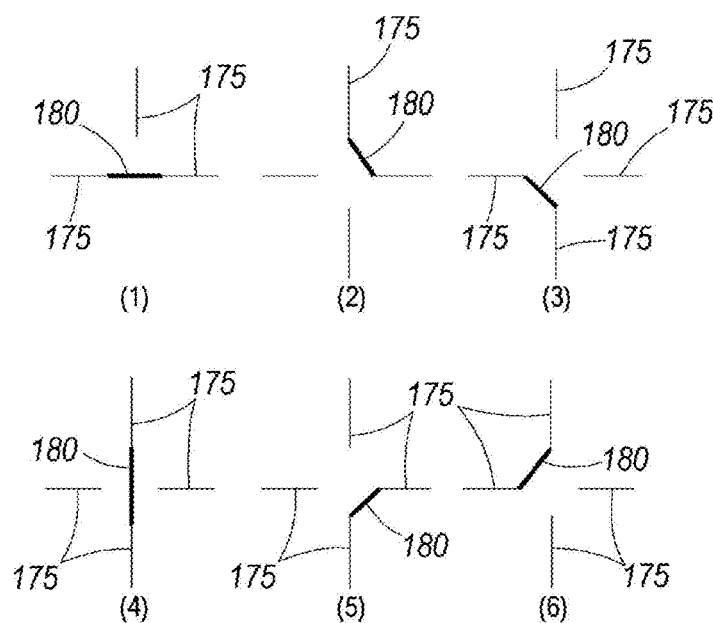

Referring to FIG. 8B, several possible interconnects may be achieved by the switches 180. FIG. 8B shows six exemplary interconnects. The switches 180 may also facilitate a connection to the connection layer to facilitate the routing of the end of the signal.

Figure 8C:
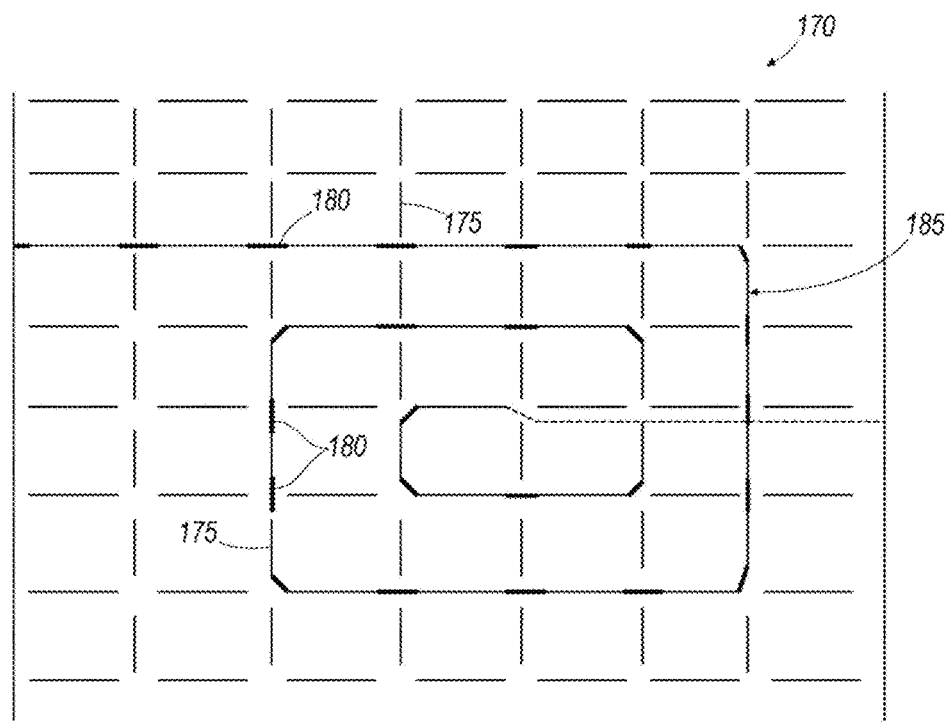

Referring to FIG. 8C, an exemplary grid 170 is shown with a plurality of interconnects being combined to form a coil 185. The coil 185 may be formed within the grid via the combined interconnects within the control layer. The coil 185 may end in the connecting layer (e.g., the dotted line in FIG. 8C.) The coil 185 may begin in the connecting layers as well.

The coil 185 may be dynamically configured each time a device 105 is placed on the charging system 110. The switches 180 may collectively form the various interconnects between the traces to allow energy to flow through the traces in a coil-like manner. The switches 180 may be controlled in response to the determined device position. Once the device position has been determined, the controller 130, or another controller within the grid 170, may instruct each switch 180 to form specific interconnects in order to form the coil 185 at the optimal transmitter position. That is, by throwing specific switches 180 to connect certain traces 175, the traces 175 may collectively form a coil 185 capable of creating an electromagnetic field.

Thus, the grid 170 may facilitate a dynamically forming coil 185 to best optimize wireless charging between the charging system 110 and the device 105 based on the position of the device 105 on the charging system 110. By including such a flexible coil within the charging system 110, the charging system 110 may be capable of more efficiency charging the device 105 at least because the coil can be developed directly below the device, thus allowing the coil and the receiver 120 of the device 105 to be in closure proximity to one another. This will in turn created a stronger magnetic field and allow less unused energy to escape into the atmosphere surrounding the device 105. A better user experience may thus increase user loyalty. Additionally, the more convenient and easy to use the system is, the more likely it is to produce revenue therefrom. If the system is convenient, users may purchase subscriptions to the system or pay an enhanced fee to use the system. There is thus a financial incentive to increase the ability for a user to receive feedback from the system.

Figure 9A:
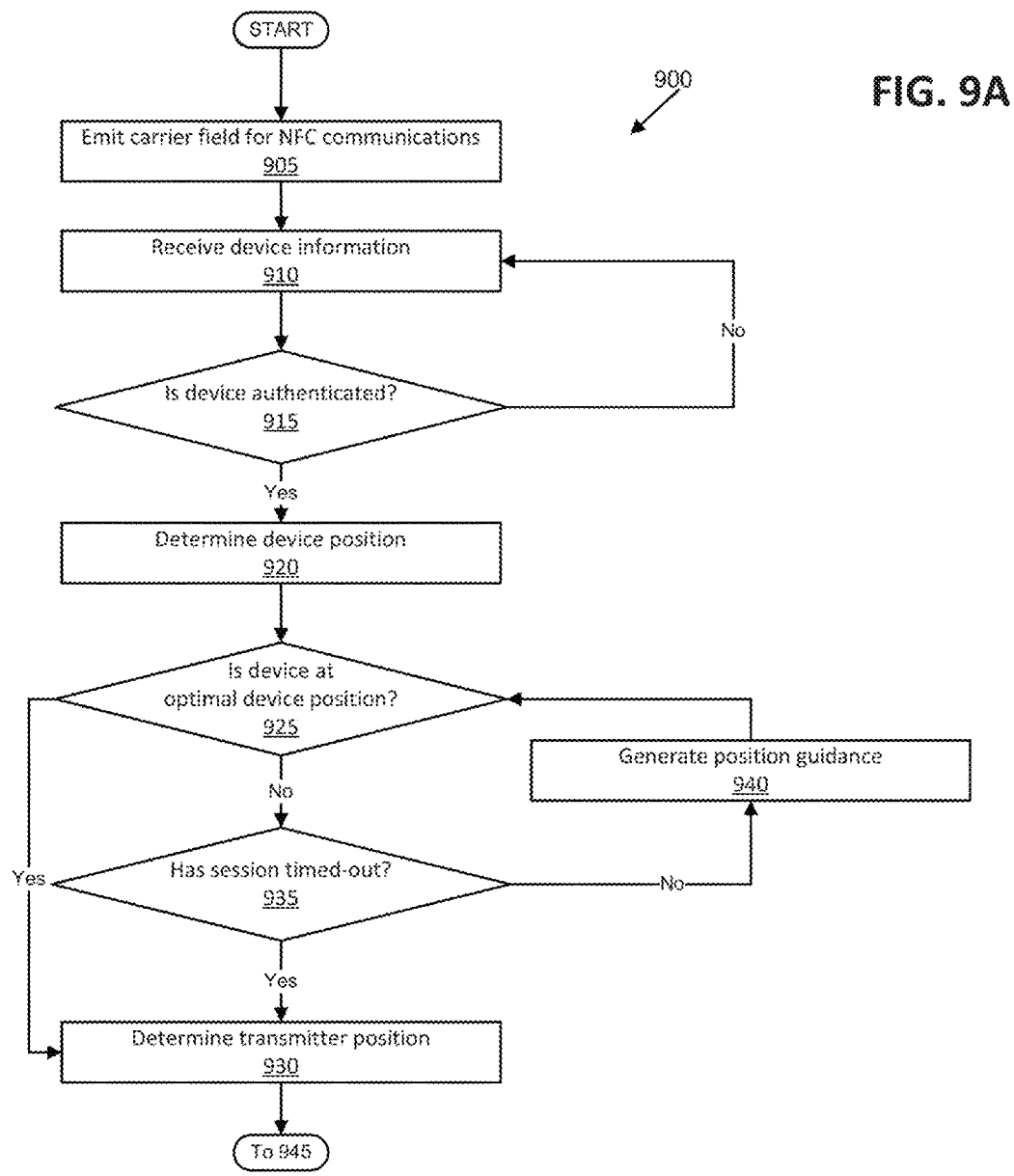
FIG. 9A is a first portion of a flow chart for an exemplary process for optimizing the device and transmitter positions.
Figure 9B:
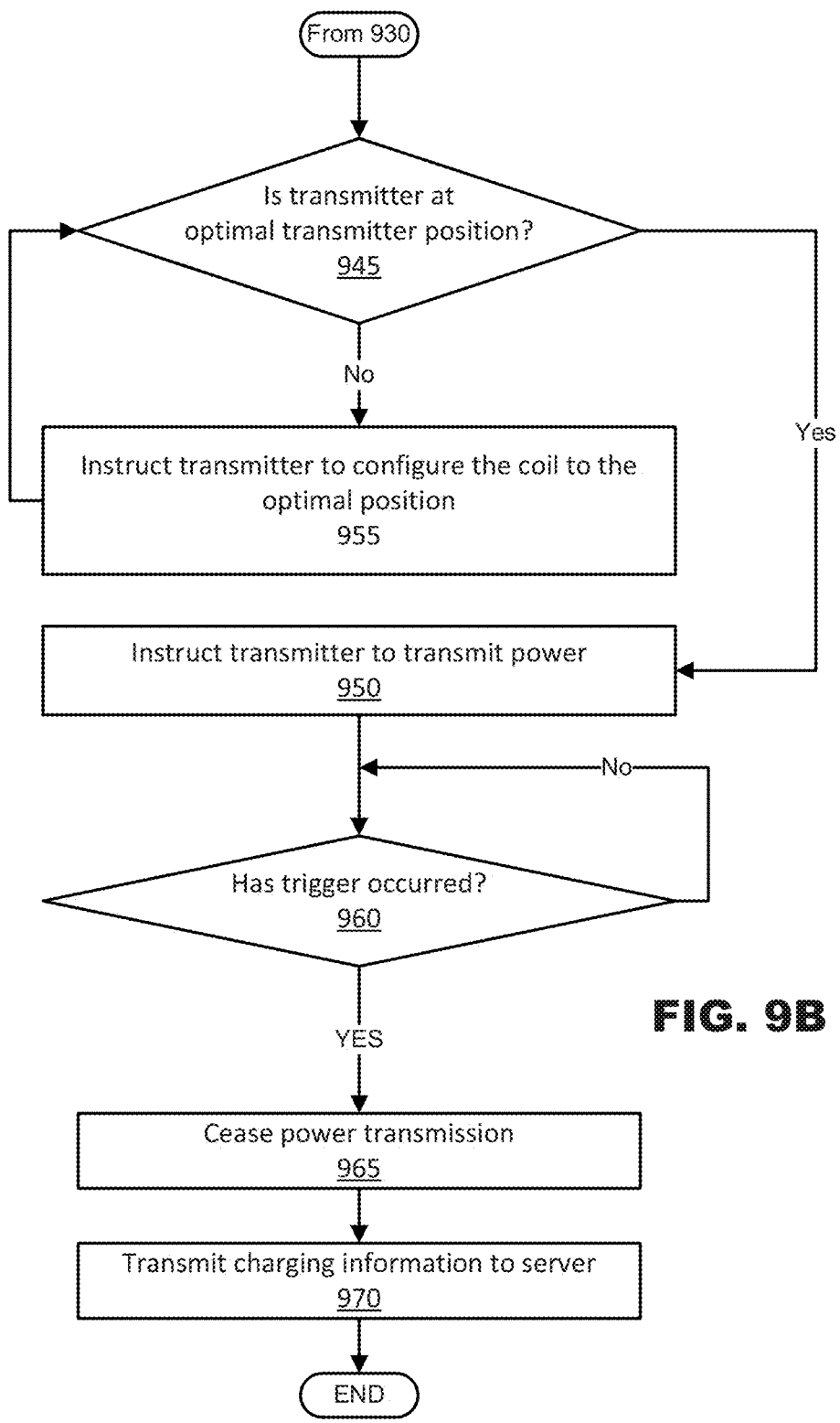
FIG. 9B is a second portion of a flow chart for an exemplary process for optimizing the device and transmitter positions.

FIG. 9, which includes FIG. 9A and FIG. 9B, is an exemplary process 900 for creating an efficient charging system between the device 105 and charging system 110 by utilizing an optimal position of the device 105 and/or transmitter 135 of the charging system 110. The process 900 beings at block 905 where, similar to block 305, the NFC controller 130 emits an electromagnetic carrier field. This field may be used to power the chip 125 within the device 105.

In block 910, similar to block 310, the controller 130 may receive device information from the device 105 via the chip 125 within the device 105. The controller 130 may acquire device information from the chip, which may be received using out-of-banc communications.

In block 915, similar to block 315, the controller 130 determines whether the device 105 is authenticated. As described above, the device 105 may be authenticated by subscribing to a wireless charging service. It may also be authenticated by agreeing to pay for wireless power transfer on a per use basis. Once the device is authenticated, the process 900 may proceed to block 920. If not, the process 900 may proceed to block 910. While the process 900 shown in FIG. 9 shows the device 105 being authenticated prior to any other determination being made (e.g., location of the device 105 with respect to the charging station), other determinations may be made prior to authentication. For example, a device's position may be determined prior to authentication. By determining the device position and allowing users to adjust based on feedback based on the position, a better NFC exchange may occur between the chip 125 and controller 130. That is, after the device 105 is in an optimal device position, the exchange of data and/or power between the components may increase in quality.

In block 920, the device position may be determined. The device position may be determined by any of the above identified methods. For example, the device position may be determined based on a field strength indicator. Additionally or alternatively, the position of the device may be determined based on the amount of flux at each magnetic flux sensor 160. The higher the measured flux at a given sensor, the closer the chip 125 of the device 105 is to that sensor. By comparing the flux across all of the sensors 165, the position of the device 105 may be determined.

In block 925, the device 105 determines whether the device 105 is at an optimal device position. As explained above, an optimal device position is one that allows the receiver 120 of the device 105 to most efficiently receive power from the transmitter 135 of the charging system 110. The optimal device position may also be one that allows the NFC chip 125 and the controller 130 to exchange information between them. Whether the device 105 is at an optimal device position may be determined by comparing the field strength with a predefined strength. The predefined strength may be a minimum field strength of the electromagnetic field created between the device 105 and the charging system 110. The predefined strength may also be a minimum flux differential between the flux sensors 160. For example, the flux at each sensor must be within a certain range of the flux at all other remaining sensors (e.g., a maximum Weber (Wb) difference amongst the flux measurements). If the device position falls within the predefined strength, then the device 105 may be considered to be in the optimal device position. If the device 105 is in the optimal device position, the process 900 proceeds to block 930. If not, the process 900 proceeds to block 935.

In block 935, the device 105 determines whether the session has timed out. That is, has the device 105 attempted to have been placed in the optimal position for a predefined amount of time. In some examples, the device may never reach an optimal position due in part to an object partially obstructing the charging system 110. In another situation, the user may be unable to respond to the feedback provided as it relates to the device position (e.g., guidance via LED's or the device interface). A predefined amount of time, by way of example only, may be approximately 20 seconds starting from the time the device 105 is authenticated in block 915. Alternatively, the clock may start running from the time the device 105 was detected by the controller 130 (e.g., when an electromagnetic field was created). If time has lapsed, the process 900 proceeds to block 930. If not, the process 900 proceeds to block 940.

In block 940, the device 105 generates position guidance in response to the current device position. In one illustrative approach the device interface may be used to guide the user on where to place the device 105 on the charging system 110. In another exemplary approach, a growing circle may be used to indicate the electromagnetic field strength (e.g., the larger the circle the greater the field strength). A power bar, digits representing the field strength (e.g. scale of 1-10), etc., may also be indicative of field strength. As explained above, LEDs may be used to indicate that the device is either not at an optimal position (e.g., red LED,) that it is close to the optimal position (e.g., yellow LED,) or on the optimal position (e.g., green LED.) Additionally or alternatively, the charging system 110 may also be capable of providing feedback via any of the described methods. The charging system 110 may include LEDs or other displays (e.g., LCD display) capable of providing the feedback guidance to the user of the device 105. Once the feedback guidance has been provided, the process 900 proceeds to block 920 where the device position is again evaluated. The process 900 continues until the session times out at block 935, or the device has achieved an optimal position at block 925.

In block 930, the transmitter position is determined. As described above, a dynamic coil may be configured as the transmitter 135 thus allowing the transmitter 135 to be moved within the charging system 110 to optimize power transfer to the device 105. The transmitter 135 may have a home position or default position which may be in the center of the charging system 110. This default position may create the largest possible coil within the charging system 110. This coil may be responsible for transmitting the initial B-field to be detected by the device 105, as described above. The transmitter 135 may also be in a position used by a previous charging session in which another device was previously charged. The transmitter position may be determined by the controller 130 or another controller within or connected to the transmitter 135. The position may be determined by evaluating the switches to see which have been thrown and if a coil has been created by a collaboration of switches. Once the position of the transmitter 135 is determined, the process 900 proceeds to block 945.

In block 945, the controller 130 determines whether the transmitter 135 is at an optimal transmitter position. This may be determined by comparing the current device position with the transmitter position. If the two occupy a similar area within a predefined area tolerance, then the transmitter 135 may be determined to be at an optimal position. For example, if on the charger grid, the area covered by the device aligns with the area covered by the transmitter 135 by at least 90%, then the transmitter 135 may be considered to be at an optimal transmitter position. In another example, if the transmitter 135 and the device 105 only overlap by 10%, the transmitter 135 may not be in an optimal position. As explained, the area covered by each of the components may be defined using a coordinate system. Such coordinate values defining the area may be compared at the device 105 or the charging system 110, as described. If the transmitter is at an optimal position, the process 900 proceeds to block 950. If not, the process 900 proceeds to block 955.

In block 950, in response to the transmitter being at the optimal transmitter position, and in response to the device 105 being authenticated, the controller 130 may instruct the transmitter 135 to transmit power to the device 105, similar to block 320. Power may be transmitted by the coil within the transmitter 135. The coil in the receiver 120 of the device 105 may receive the power and in turn, store the power via the device battery.

In block 960, the controller may determine whether a trigger event is recognized, similar to block 325. If a trigger event is recognized, the process 900 proceeds to block 965. If not, the process continues to charge the device 105 and stays at block 960.

In block 965, the controller 130 instructs the transmitter 135 to cease power transfer.

In block 970, once power transfer has ceased, charging information may be transmitted to the server 115 by the controller 130, similar to block 335.

The process 900 then ends.

By allowing for an easy to use inductive charging system, more users are inclined to use the system, thus increasing revenues from fees and subscriptions. The above system helps align the device 105 and the charging station 110 to an optimal position, or sweet spot. The receiver coil and the transmitter coil may thus create an electromagnetic field. By continuously providing feedback to the user during the process of finding the optimal position (e.g., while a magnetic field of a minimum strength is detected, updating the feedback every 0.1 s-1 s or so), a better user experience is achieved, thus increasing return customers. Fees may be paid using Isis™, or other similar systems. That is, the system may, via the user interface, or other mechanism (e.g., LED lights), continuously indicate the position of the device 105 relative to the charging system 110 in real-time or near real-time. Each time the device moves, feedback is provided to the user, indicating the location of the device relative to the charging system 110.

Another advantage to having a dynamic coil as the transmitter 135 is that the transmitter 135 can avoid objects that should not receive inductive charging. In one example, if a coin is dropped on the charging system 110 during charging, the coin will not interfere with the inductive charging of the device 105 because the coils of the transmitter are below the device 105 and not below an unoccupied portion of the charging system 110. In another example if a coin is detected, the transmitter 135 may be instructed to cease power emissions until the coin has been removed.

In general, computing systems and/or devices, such as device 105, charging system 110, server 115, controller 130, and any other processor or controller, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a charging apparatus having a controller and a power transmitter, and
a server in communication with the charging apparatus;
wherein the controller is configured to:
receive information, including device information that includes a device identifier, from a device using out-of-band signaling,
determine a device position of the device placed on the charging apparatus relative to the power transmitter based on at least one signal received from the device,
determine whether the device position is an optimal position for charging of the device if a strength of an electromagnetic field at the device is within a predetermined strength,
provide feedback indicative of the determination of the device position relative to the optimal position;
determine whether the power transmitter is at an optimal transmitter position if the power transmitter and the device are within a predefined area tolerance of each other; and
control charging of the device by the power transmitter when the power transmitter is at the optimal transmitter position;
wherein the server is configured to:
receive the device identifier from the charging apparatus, and
transmit to the charging apparatus account information associated with the device identifier, including a subscription to which the device is subscribed, the subscription including an authorized duration of charging;
wherein the power transmitter is configured to transmit wireless power to a receiver of the device using in-band signaling according to the subscription, and to stop transmitting wireless power to the receiver when a sum of charge durations has reached the authorized duration of charging;
wherein the in-band signaling allows for data to be sent within a same channel used for voice transmission, and out-of-band signaling is on a different channel not used for voice transmission; and
wherein the authorized duration of charging is a total amount of charging authorized in a month.

2. The system of claim 1, wherein the feedback is continuously provided and indicative of the device position to provide guidance as to the optimal position of the device with respect to the power transmitter.

3. The system of claim 1, wherein the feedback includes activating a plurality of LEDs adjacent to a border of the charging apparatus or device indicating positioning of the device on the charging apparatus relative to the optimal position, the LEDs activated in a particular order to indicate a change in positioning relative to the optimal position.

4. The system of claim 1, wherein the feedback includes displaying arrows on the charging apparatus or device indicating directionality to reposition the device on the charging apparatus to obtain the optimal position.

5. The system of claim 1, wherein the feedback includes displaying concentric circles on the charging apparatus or device indicating positioning of the device on the charging apparatus relative to the optimal position, the concentric circles changing in at least one of size or number to indicate a change in positioning relative to the optimal position.

6. The system of claim 1, wherein the controller is further configured to adjust, in response to the transmitter position not being at the optimal transmitter position, the power transmitter to achieve the optimal transmitter position.

7. The system of claim 6, wherein the power transmitter includes a plurality of traces configured to be interconnected by a plurality of switches to form a coil at the optimal transmitter position within the charging apparatus, the position of the coil being adjusted in response to the adjusting by the controller.

8. The system of claim 1, wherein a device with a preferred subscription receives preferential charging over a device with a non-preferred subscription.

9. A method comprising:
transmitting information, including device information that includes a device identifier, from a device having a processor and a memory to a charging apparatus over an out-of-band communications channel;
receiving, by a server from the charging apparatus, the device identifier;
transmitting, by the server to the charging apparatus, account information associated with the device identifier, including a subscription to which the device is subscribed, the subscription including an authorized duration of charging;
receiving an electromagnetic field at the device, the electromagnetic field being received from the charging apparatus over an in-band communications channel based on the subscription until a sum of charge durations has reached the authorized duration of charging;
determining the strength of the electromagnetic field;
determining, based on the strength of the electromagnetic field, a device position relative to the charging apparatus;
determining whether the device position is at an optimal position for charging if the strength of the electromagnetic field is within a predetermined strength;
providing feedback to a device user indicative of the determination of the device position;
determining a transmitter position;
determining whether the transmitter position is at an optimal transmitter position if the device position and the transmitter position are within a predefined area tolerance of each other; and
controlling charging of the device by the power transmitter when the transmitter position is at the optimal transmitter position;
wherein the authorized duration of charging is a total amount of charging authorized in a month.

10. The method of claim 9, wherein the feedback is continuously provided via a device interface and indicates the proximity of the device with respect to a transmitter within the charging apparatus.

11. The method of claim 9, wherein the feedback includes activating a plurality of LEDs adjacent to a border of the charging apparatus or device indicating positioning of the device on the charging apparatus relative to the optimal position, the LEDs activated in a particular order to indicate a change in positioning relative to the optimal position.

12. The method of claim 9, wherein the feedback includes displaying arrows on the charging apparatus or device indicating directionality to reposition the device on the charging apparatus to obtain the optimal position.

13. The method of claim 9, further comprising:
instructing, in response to the transmitter not being at the optimal transmitter position, the transmitter to move to the optimal transmitter position.

14. The method of claim 13, wherein the optimal transmitter position includes the transmitter being at least partially aligned with a receiver of the device.

15. The method of claim 14, wherein the transmitter includes a plurality of traces configured to be interconnected by a plurality of switches to form a coil at the optimal transmitter position within the charging apparatus.

16. The method of claim 9, further comprising updating a queue of devices waiting to receive charging to insert a new device with a preferred subscription into the queue ahead of an existing device with a non-preferred subscription already in the queue.

17. The method of claim 16, further comprising providing a notification to the existing device with a non-preferred subscription when the new device with a preferred subscription is entered into the queue ahead of the existing device, the notification including an updated estimated wait time until charging.

18. The method of claim 9, further comprising recording a start time and end time that the device is charged to determine a charge duration.

19. A non-transitory computer-readable medium tangibly embodying computer-executable instructions of a software program, the software program being executable by a processor of a computing device to provide operations comprising:
transmitting information, including device information of a device placed on the charging apparatus, to a charging apparatus over an out-of-band communications channel, the device information including a device identifier with which account information is associated, including a subscription to which a device is subscribed, the subscription including an authorized duration of charging;
receiving an electromagnetic field from the charging apparatus over an in-band communications channel based on the subscription until a sum of charge durations has reached the authorized duration of charging;
determining the strength of the electromagnetic field;
determining, based on the strength of the electromagnetic field, a device position of the device;
determining whether the device position is an optimal device position for charging of the device if the strength of the electromagnetic field is within a predetermined strength;
providing feedback indicative of the determination of the device position relative to the optimal position;
determining a transmitter position;
determining whether the transmitter position is at an optimal transmitter position if the device position and the transmitter position are within a predefined area tolerance of each other; and
controlling charging of the device by the power transmitter when the transmitter position is at the optimal transmitter position;
wherein the authorized duration of charging is a total amount of charging authorized in a month.

20. The medium of claim 19, wherein the feedback is continuously provided via a device interface and indicates the proximity of the device with respect to a transmitter within the charging apparatus to provide guidance as to the optimal device position with respect to the transmitter.

* * * * *